US012656973B2

(12) United States Patent     (10) Patent No.:   US 12,656,973 B2

Hornung et al.        (45) Date of Patent:    Jun. 16, 2026

(54) OPTIMIZED COMMAND QUEUES WITH LOW LATENCY

(71) Applicant: MICRON TECHNOLOGY, INC., Boise, ID (US)

(72) Inventors: Bryan Dale Hornung, Plano, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/784,284

(22) Filed: Jul. 25, 2024

(65) Prior Publication Data

US 2025/0117153 A1     Apr. 10, 2025

Related U.S. Application Data

(60) Provisional application No. 63/542,379, filed on Oct. 4, 2023.

(51) Int. Cl.
G06F 3/06         (2006.01)

(52) U.S. Cl.
CPC .......... G06F 3/0653 (2013.01); G06F 3/0611 (2013.01); G06F 3/0659 (2013.01); G06F 3/0673 (2013.01)

(58) Field of Classification Search
None
See application file for complete search history.

(56) References Cited

U.S. PATENT DOCUMENTS

| | | | | |
|---|---|---|---|---|
| 2013/0326113 A1* | 12/2013 | Wakrat | ................ | G06F 12/0868 |
| | | | | 711/E12.008 |
| 2018/0081625 A1* | 3/2018 | Xiong | ................ | G06F 12/0811 |
| 2021/0020213 A1* | 1/2021 | Mirichigni | .......... | G11C 11/2275 |
| 2022/0114118 A1* | 4/2022 | Lee | ......................... | G06F 3/061 |
| 2022/0276803 A1* | 9/2022 | Yang | ..................... | G06F 3/0656 |
| 2022/0414013 A1* | 12/2022 | Alsop | ................ | G06F 12/0857 |
| 2023/0195375 A1* | 6/2023 | Puthoor | ................ | G06F 3/0659 |
| | | | | 711/154 |

* cited by examiner

*Primary Examiner* — Jared I Rutz
*Assistant Examiner* — Alexander J Yoon
(74) *Attorney, Agent, or Firm* — Lowenstein Sandler LLP

(57) ABSTRACT

A system can include a memory; and a processing device, operatively coupled with the memory, to perform operations including: monitoring a host command stream from a host system to the memory device; determining whether a phase value of a host command in the host command stream is valid; responsive to determining that the phase value of the host command is valid, copying the host command; storing the copied host command in a queue in a local memory; and executing the copied host command in the queue in the local memory.

20 Claims, 7 Drawing Sheets

100

Message N

Message 3
Message 2
Message 1
Pointers

0

0

Phase
(1 Byte)

Message
(64 Bytes)

Pointers
(64 Bytes)

Write Index

Read Index

63

63

300A

300B

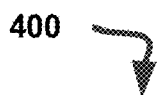
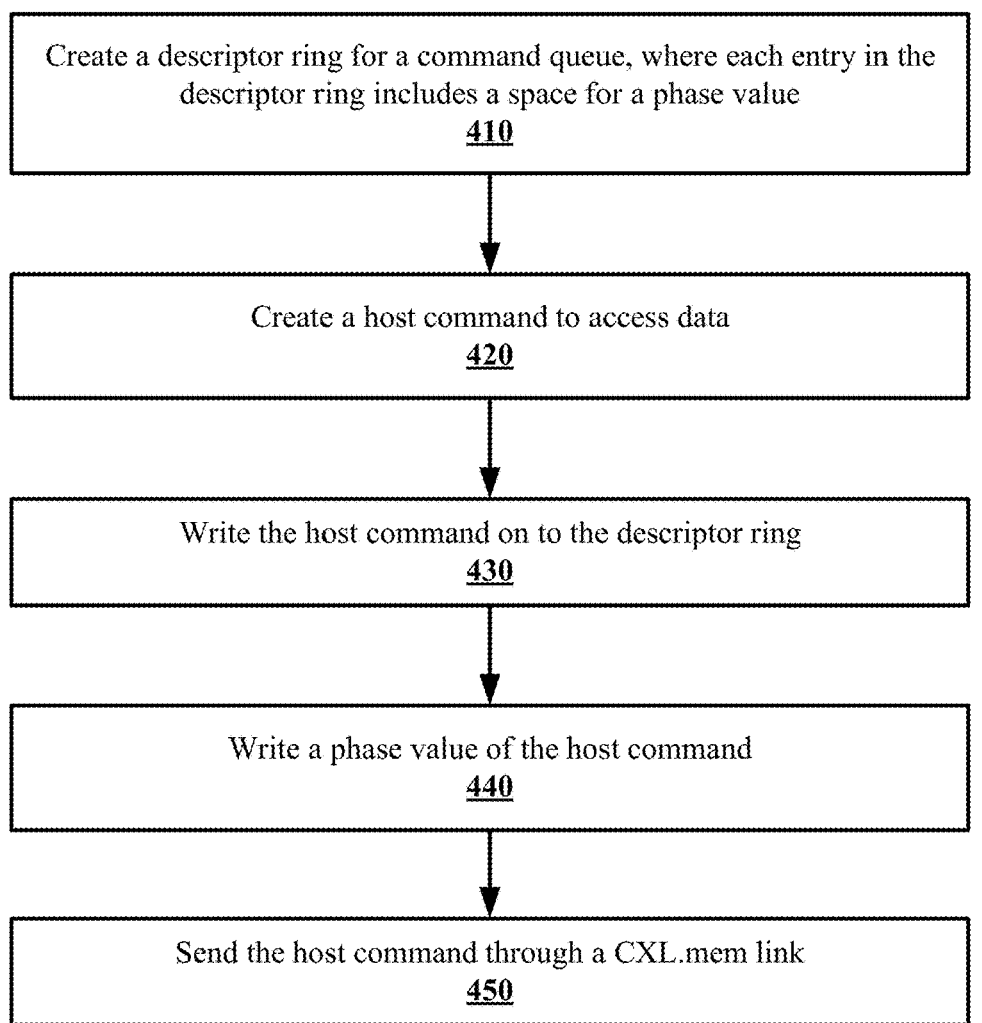
Create a descriptor ring for a command queue, where each entry in the descriptor ring includes a space for a phase value
410
Create a host command to access data
420
Write the host command on to the descriptor ring
430
Write a phase value of the host command
440
Send the host command through a CXL.mem link
450
FIG. 4

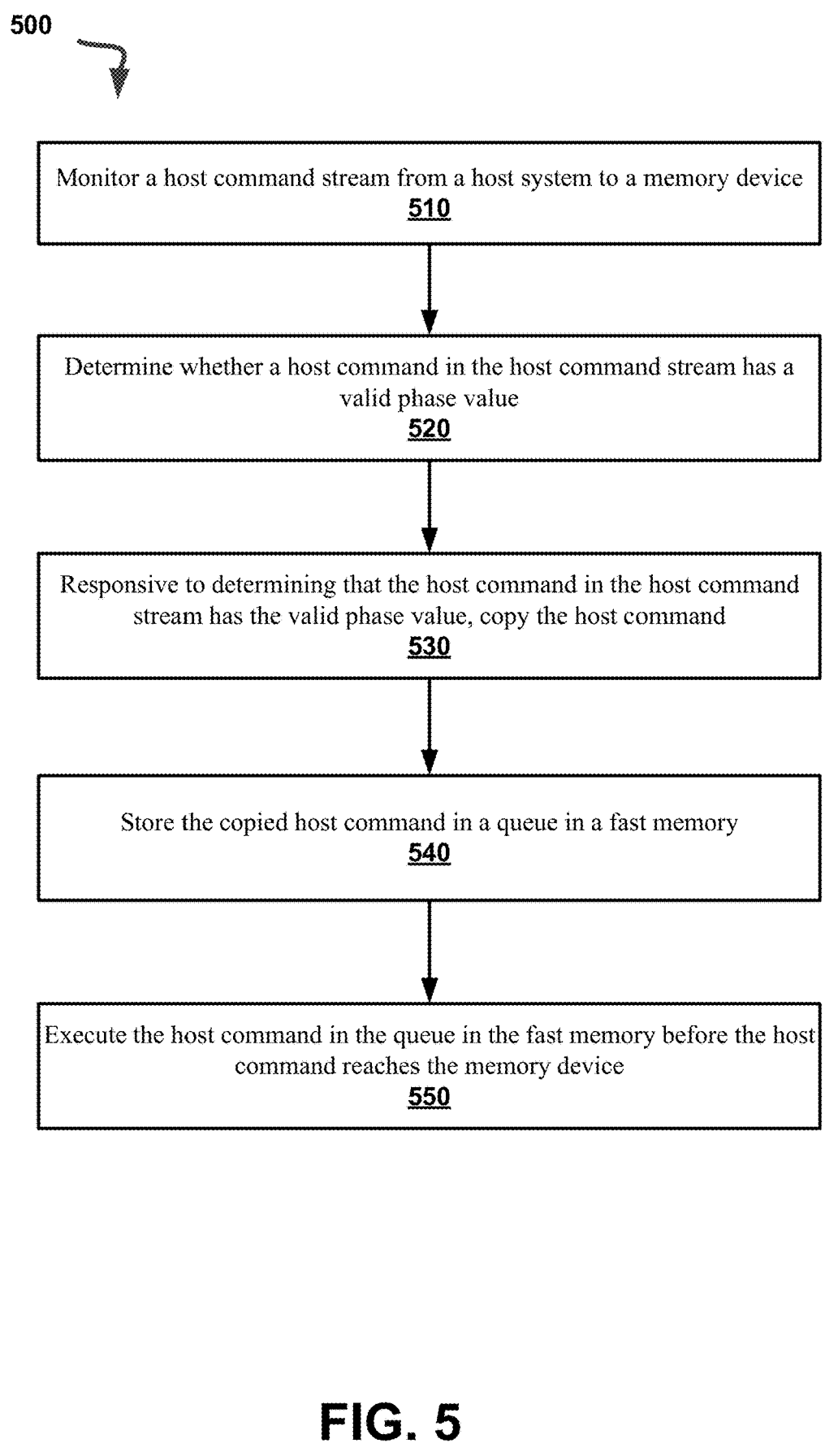

500

Monitor a host command stream from a host system to a memory device
510

Determine whether a host command in the host command stream has a valid phase value
520

Responsive to determining that the host command in the host command stream has the valid phase value, copy the host command
530

Store the copied host command in a queue in a fast memory
540

Execute the host command in the queue in the fast memory before the host command reaches the memory device
550

FIG. 5

OPTIMIZED COMMAND QUEUES WITH LOW LATENCY

REFERENCE TO RELATED APPLICATION

This application claims the benefit of U.S. Provisional Patent Application No. 63/542,379, filed Oct. 4, 2023, which is incorporated herein by reference.

TECHNICAL FIELD

Embodiments of the disclosure relate generally to memory sub-systems, and more specifically, relate to implementing optimized command queues with low latency for accelerators or other compute near memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 4 and 5 are flow diagrams of example methods for implementing optimized command queues with low latency in accordance with some embodiments of the present disclosure.

DETAILED DESCRIPTION

Figure 1:
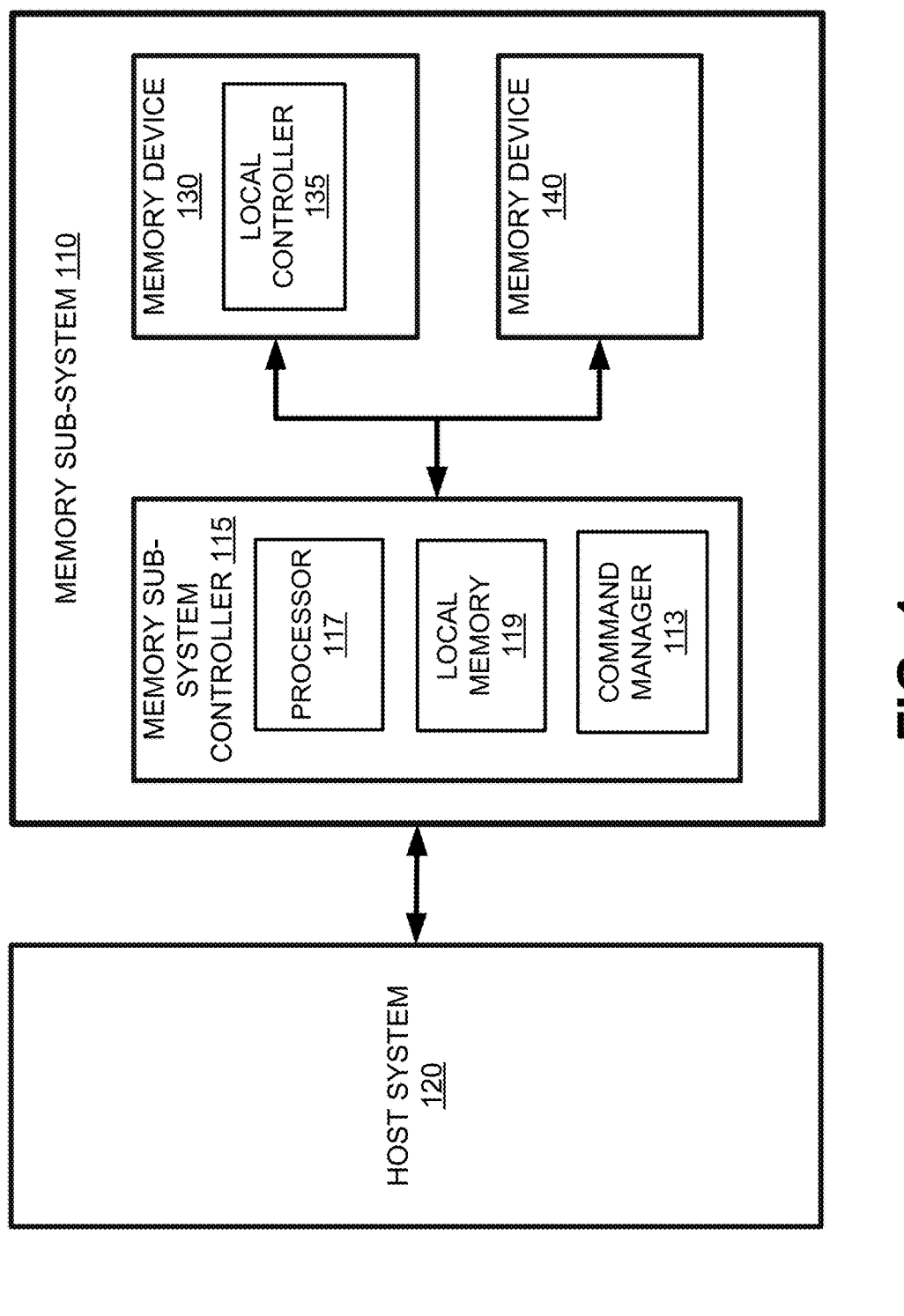
FIG. 1 illustrates an example computing system that includes a memory sub-system in accordance with some embodiments of the present disclosure.

Aspects of the present disclosure are directed to implementing optimized command queues with low latency. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A host system can initiate various data operations (e.g., write, read, erase, etc.) on a memory sub-system by generating commands. In certain memory sub-systems, a memory sub-system controller includes a command queue in which commands received from an external host system, or commands that are generated locally by the memory sub-system controller, are buffered and handled generally in a first-in-first-out order. Such commands include erase commands to erase physical blocks of memory, write commands to program certain data to one or more dice (or planes) of a memory device (e.g., a page at a time), or read commands to read certain data out of the one or more dice (or planes) of the memory device (e.g., a page at a time).

As the size and the amount of data sets continue to grow, the energy devoted to system-level data movement increases. The flow of data—from various tiers to the compute engines and back—becomes a source of system energy lost from computation, which invokes a trend to move selected compute to memory, referred to as near memory compute (NMC). NMC may include compute in a device with compute express link (CXL) technology. The CXL technology introduces a new memory interconnect and provides a pathway to NMC. CXL is an interface standard that can support a number of protocols that can run on top of peripheral component interconnect express (PCIe), including a CXL.io protocol and a CXL.mem protocol. The CXL.io protocol is a PCIe-like protocol that can be viewed as an "enhanced" PCIe protocol capable of carving out managed memory, and can provide an interface for I/O devices. The CXL.mem protocol can enable host access to the memory of an attached device using memory semantics (e.g., load and store commands), and can support both volatile and persistent memory architectures.

One example of the NMC device with CXL technology is a Global Fabric Attached Memory (GFAM) device (GFD), which differs from a traditional processor by completely disaggregating the memory from the processing units and implementing a large, shared memory pool. The memories in the large, shared memory pool can be the same type (e.g., DRAM) or different types (e.g., mixture of DRAM, NAND flash). The GFD generally supports the CXL.mem protocol, but not the CXL.io protocol for access by the host system.

Current command queue architectures are not optimized for commands to be handled in NMC processors with low latency. For example, in some command queue architecture, the doorbell bit(s) are used, which require a separate write and need to wait the whole sets of commands to be written in the queue, causing latency. As another example, in some cases where a cache coherence is required, the transactions between the host system and the processor of the memory device can involve multiple rounds of communication, causing latency. As another example, some command queue architectures use additional memory devices outside of the system (e.g., memory-mapped I/O (MMIO)) to reduce latency. However, in a system using GFD, the additional memory devices outside of the system are generally inaccessible to the host system, because the CXL.io protocol is not applicable to the system for the host access to the GFD device. The system thus cannot use MMIO method to access the additional memory devices to reduce the latency. Other solutions may also require special instruction set architecture (ISA) commands to ensure that a queue push is atomic, which may only be implemented in a subset of host architectures, to provide low latency.

Aspects of the present disclosure address the above and other deficiencies by implementing optimized command queues by including a phase value in each host command within the command queue and enabling a hardware component of a NMC processor (referred to as command manager) to monitor the command queue and process the host command based on the phase value, resulting in low latency. The phase value refers to a value stored in a reserved space of the host command to indicate whether the corresponding host command should be processed or ignored by the command manager.

Specifically, a host system can generate a host command directed to a memory device, and write, as the last step of generating the host command, the new phase value in the host command. The host system uses the write index to generate the phase value, where the phase value comprises the last bit(s) of the result of the write index divided by the descriptor ring size. The host system places the host command in a command queue (e.g., in a form of descriptor ring) in the host cache memory and pushes (e.g., by a cache flush operation), through a CXL.mem link (e.g., according to transaction specification defined in a protocol), the commands of the command queue in the order by which commands are generated. The command manager monitors the stream from the CXL.mem link for host commands, and for each host command in the host command stream, determines whether the phase value of the host command is valid. To determine whether the phase value is valid, the command manager may compare the phase value of the host command with a value derived from a read index. The phase value is valid when the phase value is equal to the last bits(s) (the least significant bits) of the result of the read index divided by the descriptor ring size. The determination of the phase value being valid indicates the corresponding host command should be processed. The phase value is invalid when the phase value is not equal to the last bits(s) of the result of the read index divided by the descriptor ring size. The determination of the phase value being invalid indicates the corresponding host command can be ignored. As such, the phase value can be used by the host system as a toggle to switch between processing and ignoring the command as the host system knows whether the command should be processed when generating the command. For example, if the host command has not fully completed writing the data into the command but has to wrap up the command, the host system knows that the command should not be processed, thus, rendering an invalid phase value to the command. If the host command generates a command under a normal situation without issue, the host system knows that the command should be processed, thus, rendering a valid phase value to the command.

In some implementations, the CXL.mem link that conveys the writes transactions with commands between the host system and the memory device may reorder transactions such that commands may arrive at the memory device in an order different from the order in which the commands were issued from the host system. Although the command manager is monitoring the write stream within the command ring for a new phase, it may only process the command at the memory location that is referenced by the current read index and with the valid phase. Other commands with the valid phase are noted (e.g., by associating the command with a bit in a received command bit vector) in the command manager but are otherwise ignored and proceed to the memory device. The received command bit vector may include a set of bits, where each bit is associated with a command that has a valid phase but is not referenced by the current read index. In some implementations, the received command bit vector may be included in the command manager. Once the command with the valid phase and referenced by the current read index is received and processed, the next read index is used to access a bit in the received command bit vector. If the bit is associated with a command, the command is retrieved from the memory device and processed by the command manager, and the bit is cleared for another use. This ensures that commands are processed in the command manager in the same order as they were issued by the host system.

Responsive to determining that a host command has a valid phase value, the command manager copies the host command and stores the copied host command in a queue, in a local memory (e.g., SRAM) that is faster than the memory device (e.g., DRAM or non-volatile memory), within the command manager. The local memory can include a SRAM that is capable of executing a command faster than a DRAM or non-volatile memory. The local memory is "local" with respect to the command manager compared to the memory device. The local memory may be located in the command manager. The local memory may be volatile or non-volatile memory. The command manager executes the copied host command stored in the queue in an order by which the copied host commands are stored. If the host command is received out-of-order by the command manager, the host command is ignored temporarily by the command manager, proceed to the memory device, and read back from the memory device and placed in the queue (e.g., SRAM) in the command manager after earlier-received, valid commands are processed by the command manager. While the original host command can be still transmitted to the memory device as normal, for example, through another communication link, executing the copied host command in the faster local memory are likely to be prior to the original host command reaching the memory device. Executing the copied host command involves single fabric latency, while receiving the original host command involves at least double fabric latency because of the additional time required to write both the command and the write index (as a command valid indication, also known as a 'doorbell write'). As the CXL technology enables variable delay for memory accesses, it potentially allows time for command manager to access data and complete the execution of the copied host memory before the memory returns a response to the original host write transaction.

Responsive to determining that a host command has an invalid phase value, the command manager ignores the host command, and the host command are sent to the memory device as normal. Accordingly, by copying a supposed-to-be processed command into a fast queue for executing, the supposed-to-be processed command is executed (e.g., written) much faster than that without copying, and by letting a supposed-not-to-be processed command to be written as normal, the system performs as a normal CXL memory device.

Advantages of the present disclosure include enhancing the system performance by providing a system and method to reduce the latency for executing a host command directed to a memory device. Aspects of the present disclosure avoids the usage of additional memory resources not included in a GFAM device (e.g., MMIO). Also, using the phase value for valid indication of a command can provide resilience to executing the uncompleted host command (e.g., evicted cache line) as the phase value is written as the last step of generating the host command. Further, using the phase value for valid indication of a command can provide resilience to retry from the host system to transmit a host command that has not been successfully transmitted to the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system

120. FIG. 1 illustrates a memory sub-system 110 as an example. In general, the host system 120 can access multiple memory sub-systems via a same communication connection, multiple separate communication connections, and/or a combination of communication connections.

The NVMe interface is a communications interface/protocol developed for SSDs to operate over a host and a memory device that are linked over a PCIe interface. The NVMe protocol provides a command queue and completion path for access of data stored in memory devices by host system 220. In some embodiments, the interface between the host system and the memory device can implement one or more alternate protocols supported by another interface standard. For example, the interface can implement one or more alternate protocols supported by PCIe (e.g., non-PCIe protocols). In some embodiments, the interface can be represented by the compute express link (CXL) interface or any communication link that allows cache line granularity updates and shares coherency control with the processing device.

A CXL system is a cache-coherent interconnect for processors, memory expansion, and accelerators. A CXL system maintains memory coherency between the CPU memory space and memory on attached devices, which allows resource sharing for higher performance, reduced software stack complexity, and lower overall system cost. Generally, CXL is an interface standard that can support a number of protocols that can run on top of PCIe, including a CXL.io protocol, a CXL.mem protocol and a CXL.cache protocol. The CXL.io protocol is a PCIe-like protocol that can be viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processors.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a command manager 113 that can be used to implement optimized command queues with low latency, in accordance with embodiments of the present disclosure. In some embodiments, the memory sub-system controller 115 includes at least a portion of the command manager 113. In some embodiments, the command manager 113 is part of the host system 110, an application, or an operating system. In other embodiments, local media controller 135 includes at least a portion of command manager 113 and is configured to perform the functionality described herein. Further details regarding the operations of the command manager 113 will be described below with reference to FIGS. 2-6.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
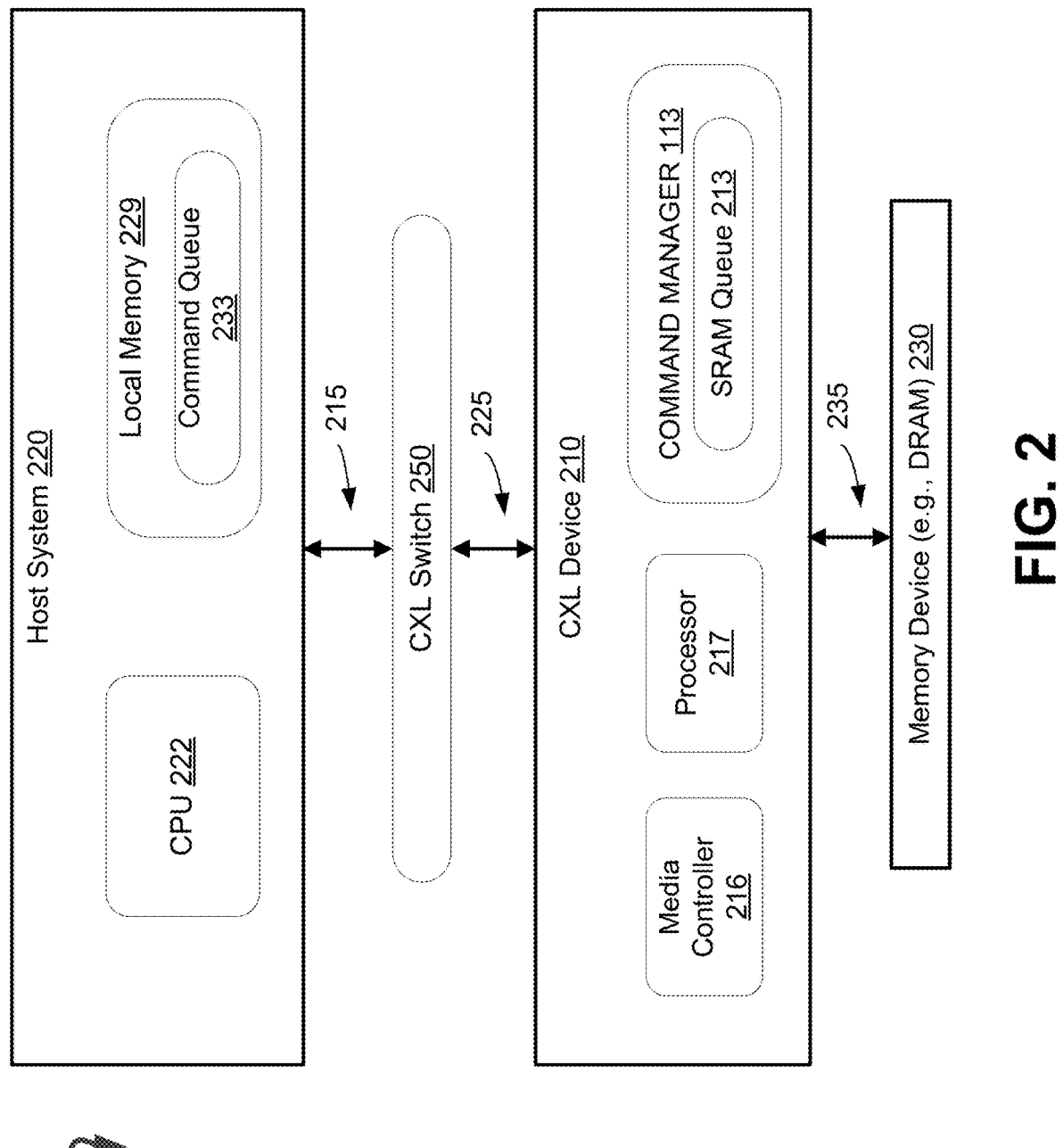
FIG. 2 is a block diagram of an example system for implementing optimized command queues with low latency, in accordance with some embodiments of the present disclosure.

FIG. 2 is a schematic block diagram of a system 200 implementing optimized command queues with low latency. In various embodiments, the system 200 includes a host system 220, a compute express link (CXL) device 210, and a memory device 230. In some implementations, the CXL device 210 may be the memory sub-system controller 115 of FIG. 1, and the memory device 230 may be the memory device 130, 140 of FIG. 1.

The host system 220 can include a central processing unit (CPU) 222 and a host memory 229. CPU 222 executes computer-readable program code (e.g., software or firmware) executable instructions (herein referred to as "instructions"). The instructions may be executed by various components of CPU 222, such as processor, logic gates, switches, application specific integrated circuits (ASICs), programmable logic controllers, embedded microcontrollers, and other components of CPU 222. The instructions executable by the CPU 222 for carrying out the embodiments described herein are stored in a non-transitory computer-readable storage medium.

The host system 220 can provide spatial and temporal locality of memory access patterns to optimize performance and can use higher performance and lower capacity media, referred to as caches, to store data that is accessed frequently (temporal locality) or data located in a memory region that has recently been accessed (spatial locality). The host memory 229 can include such cache memory. The host memory 229 can be associated with a protocol that specifies the size of a management unit used by the memory component and/or the preferred sizes for requests to access data stored at the management unit. For example, a protocol for one memory component can specify that 512 kilobyte (KB) size requests be performed on the memory component. An application executing on a host system can initially request to read 512 KB of data from the memory component, but the 512 KB request is typically broken up into smaller granularity requests (e.g., 8096 requests with each request in 64 B size) due to a protocol of a bus used to communicate between the host system and the CXL device. The host system 220 can perform the smaller granularity requests to obtain the data from the memory component of the memory device 230, which can then be stored in a cache in the host memory 229, and/or returned to the requesting application in the host system 220. Executing the smaller granularity requests on a memory component that is capable of handling larger granularity requests can lead to faster wear of the memory component and a lower endurance as more read operations will be performed at the memory component.

The system 200 can optionally include a CXL switch 250 coupled to the host system 220 via a CXL connection 215 or a communication link that allows high-speed communication and shares coherency control with the processing device. The CXL connection 215 can include a set of data-transmission lanes ("lanes") for implementing CXL protocols, including CXL.io, CXL.mem, and CXL.cache. The CXL connection 215 can include any suitable number of lanes in accordance with the embodiments described herein. For example, the CXL connection 215 can include 16 lanes (i.e., CXL x16). The system 200 can further include a CXL connection 225, and a CXL device 210 operatively coupled to the CXL switch 250 via the CXL connection 225. The CXL connection 225 can include any suitable number of lanes in accordance with the embodiments described herein. For example, the CXL connection 225 can include 4 lanes (CXL x4).

The CXL device 210 can include a command manager 113, a processor 217, and a media controller 216. Using the configuration shown in FIG. 2, the CXL device 210 can include a CXL link with CXL.mem protocol support. More specifically, the CXL device 210 can allocate a portion of the memory device 230 as a memory component that will be visible through CXL.mem. The memory component can be accessible over CXL.mem. For example, the memory component can have a size of 32 MB. However, such a size is purely exemplary. In an illustrative example, the CXL device 210 is a GFD. A GFD is like a traditional CXL Type-3 device, except it can be accessed by multiple nodes (e.g., up to 4095) in flexible ways using port-based routing. This architecture opens up possibilities in constructing powerful systems comprising of compute and memory elements arranged to suffice the needs of particular workloads.

The memory device 230 can include a dynamic random access memory (DRAM), a synchronous dynamic random access memory (SDRAM), a ferroelectric random access memory (FeRAM), a magnetic random access memory (MRAM), or a resistive random access memory (RRAM) including a number of sub-components. A memory component of the memory device 230 can refer to any portion of the memory device 230.

In some implementations, the CPU 222 can create a descriptor ring for a command queue, where each host command in the command queue corresponds to an entry of the descriptor ring, and each entry in the descriptor ring includes a space reserved for a phase indication of the corresponding host command. The value written in the space reserved for the phase indication (referred to as phase value) indicates whether the corresponding host command is a command that should be processed. The phase value is written as the last step of generating the command. The phase indication can be referred to as having a valid phase value when the corresponding host command is a command that should be processed. The phase indication can be referred to as having an invalid phase value when the corresponding host command is a command that can be ignored for processing. In one implementation, the phase value can be written in a bit value, where a value that equals the last bits(s) of the result of the write index divided by the descriptor ring size means the phase value is valid and a value that does not equal the last bits(s) of the result of the write index divided by the descriptor ring size means the phase value is invalid. In some implementations, the phase value can be written in a byte value, where certain bytes means that the phase value is valid and the rest bytes means that the phase value is invalid. A different byte value means the phase value is valid during each traversal of the ring. Some details of host commands with phase values are described below with respect to FIGS. 3A-3B in addition to FIG. 2.

Figure 3A:
FIG. 3A illustrates an example of a command queue for implementing optimized command queues with low latency in accordance with some embodiments of the present disclosure.

Referring to FIG. 3A, a host command may be referred to one or more messages 1-N. The message may be a size of cache line. A cache line may refer to a sequence of memory bytes with a particular alignment and length. In CXL systems, for example, the alignment and length constraints may be 64 bytes. A command queue 300A may be a region of memory containing a sequence of data entries and the state information associated with the command queue. The data entries can hold cache line metadata (e.g., the address of the content of the cache line within the memory device) and cache line content as well. In some implementations, the state information includes a pointer to the "next" memory buffer, a write index, and a read index. The write index indicates a location to write data, and the read index indicates a location to read data.

Figure 3B:
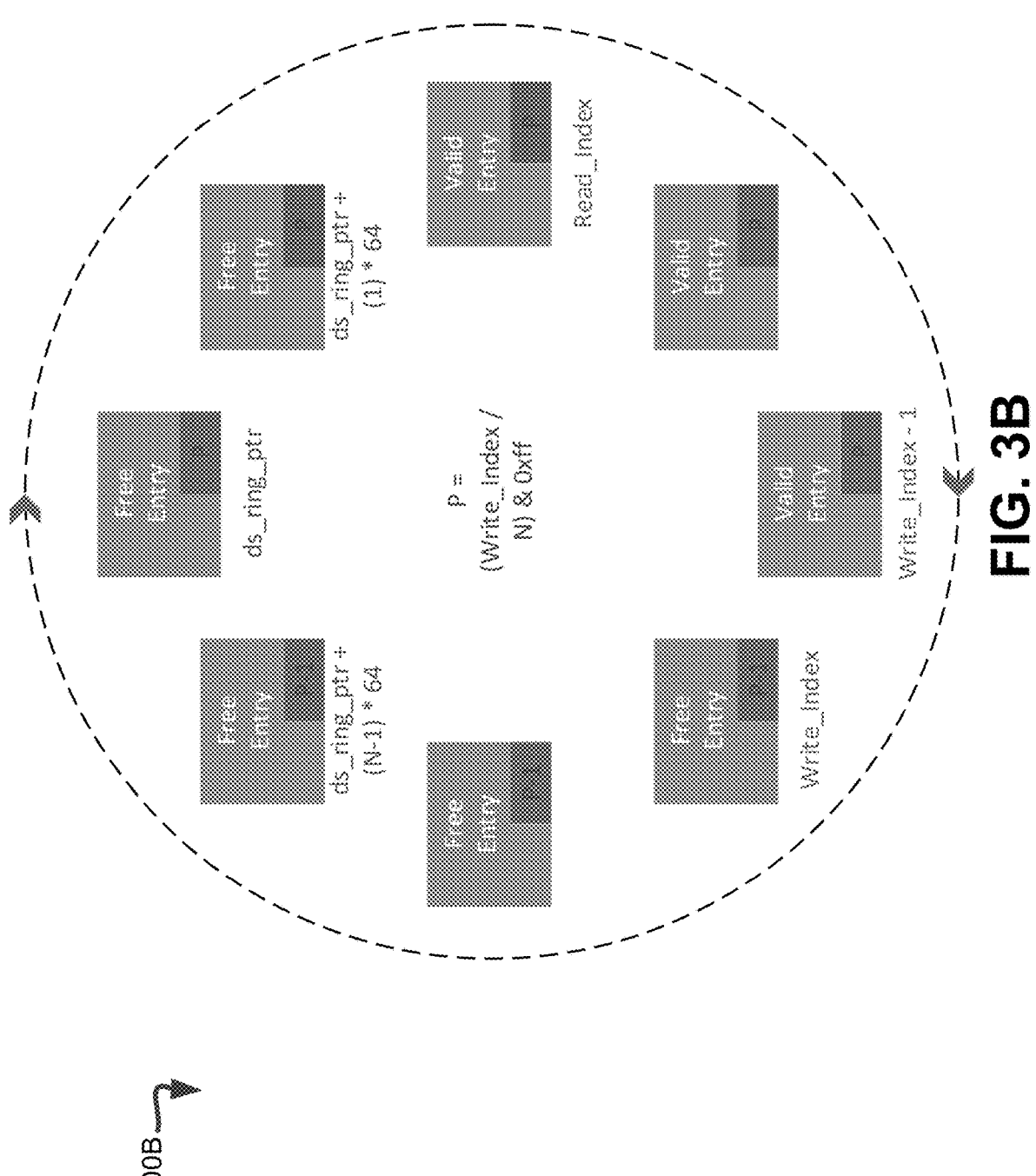
FIG. 3B illustrates an example of a descriptor ring for implementing optimized command queues with low latency in accordance with some embodiments of the present disclosure.

Referring to FIG. 3B, the command queue can be considered a circular buffer where entries are reused after being freed. The host system can write entries onto the descriptor ring 300B, increments the write index (e.g., Write_Index), and writes a phase value, which can serve as the doorbell to signal the CXL device that a new entry has been written. The CXL device reads from the ring, increments the read index (e.g., Read_Index) to indicate that the entry is now freed, and performs the requested operation. The descriptor ring 300B is used as a memory buffer that includes a naturally aligned 64-byte entry that instructs the CXL device to perform a given operation. In some implementations, each entry corresponds to a host command. The descriptor ring 300B is a circular ring that starts at a specified address (e.g., ds_ring_ptr). The descriptor ring 300B is contiguous at the translation level configured for the CXL device. The descriptor ring 300B is configured to contain a given number of descriptor ring entries (e.g., 8). The number of descriptor ring entries can be a power of two to simplify the arithmetic needed to generate the phase value. The number of bytes allocated in memory for the descriptor ring 300B can be cache line size multiplied with the number of descriptor ring entries (e.g., 8*64 byte).

The descriptor ring 300B requires "start" and "end" indicators. Rather than using memory pointers to track these, the descriptor ring 300B can use 64-bit unsigned logical indices to indicate the start (e.g., Read_Index) and end (e.g., Write_Index) of the descriptor ring. The logical indices need only to be mapped onto the addresses of entry in the descriptor ring 300B when writing or reading an entry at a given index. The circular direction shown by the arrow of FIG. 3B indicates the direction for using the memory buffer. The read index should always be less than or equal to the write index, where the equal condition indicates that the queue is empty. The phase value that indicates a valid command is the least significant bits of the write index divided by the descriptor ring size.

Referring back to FIG. 2, the CPU 222 can generate a host command to access (e.g., write or read) data stored in the memory device 230 and send the host command to be stored in a command queue 233 in the host memory 229. In some implementations, the host command is a write command. The CPU 222 can generate the host command onto a descriptor ring for a command queue and write the phase value. For example, the CPU can write bit 1 as the phase value, as a toggling from bit 0 or as an update of the previous value bit 0. In some implementations, the data of the command has not finished but, for example, a cache evict occurs, the CPU 222 can keep the phase value as bit 0, since the phase value needs to be written last for the host command, i.e., all other data to be written in the host command needs to be written before the phase value is written. The CPU 222 will increment the write index (e.g., Write_Index) after updating the phase value. The CPU 222 can send the command queue including the host command to the local memory 229. The local memory 229 stores the command queue 233. The command queue 233 can be stored in an in-memory cache, which is part of the host memory 229 (e.g., DRAM) and used to speed up access to data stored on slower memory storage by temporarily storing portions of the data in faster memory storage that can be accessed more quickly than the slower memory storage. Thus, data that is in the cache can be read and written more quickly than data that is not in the cache. In the example illustrated in FIG. 3B, the CPU 222 writes a host command at an entry pointed by the write index (e.g., Write_Index) onto the descriptor ring 300B, writes the phase value (e.g., bit 1) of the entry, and increments the write index (e.g., Write_Index+1 as one space movement in the circular direction shown by the arrow of FIG. 3B).

The host system 220 can push the command queue 233 through the CXL.mem connection (e.g., the CXL connections 215 and 225) to the CXL device 210 using a cache flush or other mechanism to cause a cache eviction. The host command in the command queue 233 can be generated under a CXL.mem protocol. The command manager 113 can monitor CXL.mem write connection for writes to the command queue 233. In some implementations, the command manager 113 can include a queue address and a queue size (e.g., the descriptor ring size). The command manager 113 detects a host command belonging to the command queue 233 by detecting a write command including a memory address that is equal to the queue address added by offset address (e.g., the offset address can be a reminder of the read index divided by the queue size). In some implementations, the command manager can monitor the commands destined to the memory device 230. In some implementations, a simple logic can perform the monitoring and forward the commands destined to the queue-offset address described above to the command manager.

The command manager 113 can determine whether the host command included in the command queue 233 has a valid phase value or an invalid phase value. In the example illustrated in FIG. 3B, each entry in the descriptor ring 300B includes a phase value (represented by P). Based on the number of the entries (e.g., N), the phase value P being valid can equal the bit indication of the write index (e.g., P=(Write_Index/N) & 0xff). Using a number of entries value of N that is a power-of-two simplifies the hardware necessary to determine the valid phase value, The command manager 113 can determine whether the entry pointed by the read index has a valid phase value or an invalid phase value by comparing the phase value in the command pointed by the read index (which can be derived as the last bits of the result of dividing the read index by the descriptor ring size) with the valid phase value (which is equal to the last bits of the result of dividing the write index by the descriptor ring size). A valid phase value indicates that the write index used when producing the entry equals the read index used to access the entry.

In some implementations, the command manager 113 can determine that the entry (i.e., the host command) has a valid phase value when the phase value of the entry pointed by the read index is equal to the last bits of the result of dividing the write index by the descriptor ring size, which means that the entry should be processed. Responsive to determining that the host command has a valid phase value, the command manager 113 copies the host command and stores the copied host command in a SRAM queue 213 for processing. The command manager 113 also increments the read index (e.g., Read_Index). Changing the phase value to an invalid phase value is not necessary because a different value will indicate a valid command during the subsequent traversal of the ring and the host writes a new value to the phase when generating a command. In some implementations, the SRAM queue 213 is a first-in-first-out queue. In some implementations, the command manager 113 includes the SRAM queue 213, In some implementations, the plurality of copied host commands stored in the queue in the faster local memory are in an order of the plurality of corresponding host commands being created. If a host command that has a valid phase is received out-of-order by the command manager, the host command may be ignored temporarily by the command manager and proceed to the memory device. This host command can be read back from the memory device and placed in the SRAM queue in the command manager after earlier-received, valid commands are processed by the command manager. This can ensure executing a plurality of host commands in the command manager in an order of a plurality of corresponding host commands being created. The command manager 113 can execute the copied host command, according to the order of the host commands stored in the SRAM queue 213. In the example illustrated in FIG. 3B, the command manager 113 reads the entry pointed by the read index (e.g., Read_Index) from the descriptor ring 300B, increments the read index (e.g., Read_Index+1 as one space movement in the circular direction shown by the arrow of FIG. 3B), and performs the requested operation as requested in the host command. In some implementations, the command manager 113 can execute the copied host command before the original host command reaches the memory device 230. As such, the host commands are processed with low latency.

In some implementations, the command manager 113 can determine that the entry (i.e., the host command) has an invalid phase value when the phase value is the phase value of the entry pointed by the read index is not equal to the last bits of the result of dividing the write index by the descriptor ring size, which means that the entry should be ignored. Responsive to determining that the command queue 233 includes a host command that has an invalid phase value, the command manager 113 ignores the host command. The processor 217 (e.g., on-chip network processor) may process the host command as usual and communicate with media controller 216 to access the memory component of the memory device 230 as indicated in the host command. The CXL device 210 may then access the memory component of the memory device 230 via the connection 235. In some implementations, the memory component of the memory device 230 stores the entire command queue 233. Since the memory component of the memory device 230 stores the entire command queue 233 regardless of the host command having a valid or invalid phase value, while the command manager 113 only stores and processes the host command that has valid phase value, the host command that has valid phase value would be executed with low latency because it is directly processed in a faster local memory without the need for an additional connection (e.g., the connection 235) from the CXL device to the memory device.

FIGS. 4 and 5 are flow diagrams of example methods 400 and 500 for implementing optimized command queues with low latency, in accordance with some embodiments of the present disclosure. The methods 400 and 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 400 and 500 are performed by the command manager 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 4, the method 400 can be performed by a processing device (e.g., CPU 222) at the host system (e.g., the host system 120 of FIG. 1 and the host system 220 of FIG. 2). At operation 410, the processing device can create a descriptor ring for a command queue (e.g., command queue 233), where the descriptor ring includes a plurality of entries and each entry in the descriptor ring includes a space reserved for storing a phase value. In some implementations, the processing device can generate a commend queue in another form as long as each host command included in the command queue includes a space reserved for storing a phase value.

At operation 420, the processing device can create a host command to access (e.g., write or read) data. In some implementations, the host command specifies a queue address. At operation 430, the processing device can write the host command on to the descriptor ring. In some implementations, the processing device can place the host command on to the descriptor ring based on the queue address. In some implementations, the processing device can place the host command on to a command queue in another form based on the queue address.

At operation 440, the processing device can write a phase value of the host command. The processing device writes the phase value of the host command as a last step of generating the host command. In some implementations, the processing device can write a bit value (e.g., bit 1) to the phase value. In some implementations, the processing device write a value to the phase value as long as the value can indicate whether the host command should be processed or ignored. In some implementations, the value indicating that the host command should be processed represents a valid phase value, and the value indicating that the host command should be ignored represents an invalid phase value. The valid phase value may be the least significant bit(s) of the result of the write index divided by the descriptor ring size. At operation 450, the processing device can send the host command through a CXL.mem link (e.g., connections 215 and/or 225) to an NMC device (e.g., CXL device 210). In some implementations, the NMC device is a CXL GFD.

Referring to FIG. 5, the method 500 can be performed by a processing device (e.g., the command manager 113 of FIGS. 1 and 2) at the memory sub-system (e.g., the memory sub-system 110 of FIG. 1 or the CXL device 210 of FIG. 2). At operation 510, the processing device monitors a host command stream from a host system to the memory device. In some implementations, the host command stream comprises a descriptor ring, and the descriptor ring comprises a plurality of entries and each entry corresponds to a host command.

At operation 520, the processing device determines whether a phase value of a host command in the host command stream is valid. In some implementations, the host command is placed in one entry of the plurality of entries of a descriptor ring. In some implementations, to determine whether the phase value of the host command in the host command stream is valid, the processing device determines whether the phase value is updated by the host system. In some implementations, to determine whether the phase value of the host command in the host command stream is valid, the processing device determines whether the phase value of the command pointed by the read index equals the least significant bit(s) of the result of dividing the write index by the descriptor ring size.

At operation 530, responsive to determining that the phase value of the host command in the host command stream is valid, the processing device copies the host command. For example, the processing device may determine that the message N shown in FIG. 3A has a valid phase value, where message N includes message payload and metadata; the processing device may copy message N by making a duplicated message N including the message payload and metadata. At operation 540, the processing device stores the copied host command in a queue in a faster local memory. In some implementations, the faster local memory is SRAM. For example, the queue may be the SRAM queue 213 of FIG. 2. In some implementations, the queue in the faster local memory is a first-in-first-out queue. At operation 550, the processing device executes the copied host command in the queue in the faster local memory (e.g., SRAM queue 213 of FIG. 2). In some implementations, the processing device executes the copied host command in the queue in the faster local memory (e.g., SRAM queue 213 of FIG. 2) prior to the host command reaching the memory device (e.g., the memory device 230 of FIG. 2).

Figure 6:
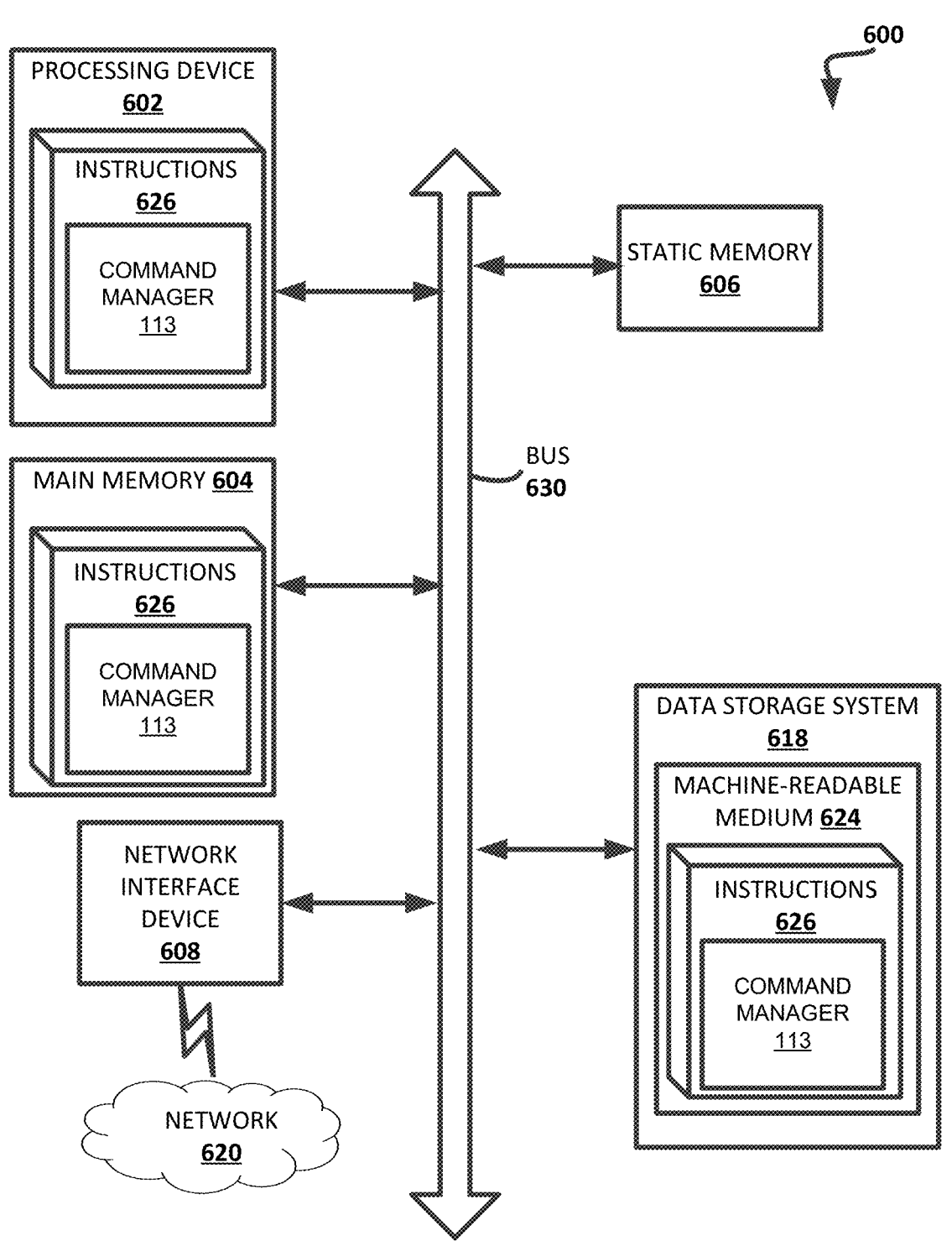
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command manager 113 of FIG. 1 and FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory management component (e.g., the command manager 113 of FIG. 1 and FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
monitoring a host command stream from a host system to the memory device;
determining whether a phase value of a host command in the host command stream is valid;
responsive to determining that the phase value of the host command is valid, copying the host command by making a duplicated copy of the host command;
storing the copied host command in a queue in a local memory; and
executing the copied host command in the queue in the local memory.

2. The system of claim 1, wherein executing the copied host command in the queue in the local memory is performed prior to the host command reaching the memory device.

3. The system of claim 1, wherein the host command stream comprises a descriptor ring, wherein the descriptor ring comprises a plurality of entries, and wherein the host command is placed in one entry of the plurality of entries.

4. The system of claim 1, wherein determining whether the phase value of the host command is valid comprises:
determining whether the phase value derived from a write index equals a value derived from a read index.

5. The system of claim 1, wherein the operations further comprise:
responsive to determining that the phase value of the host command is not valid, ignoring, by the processing device, the host command.

6. The system of claim 1, wherein the operations further comprise:
storing the host command in the memory device.

7. The system of claim 1, wherein the operations further comprise:
storing a plurality of copied host commands in the queue in the local memory in an order of a plurality of corresponding host commands being created.

8. The system of claim 1, wherein the host command is generated under a CXL.mem protocol.

9. The system of claim 1, wherein the host command comprises data to be written to the memory device.

10. The system of claim 1, wherein the processing device comprises a near memory compute (NMC) device.

11. The system of claim 1, wherein the local memory comprises a static random access memory (SRAM).

12. The system of claim 1, wherein the processing device comprises the local memory.

13. A method comprising:
monitoring, by a processing device, a host command stream from a host system to a memory device;
determining whether a phase value of a host command in the host command stream is valid;
responsive to determining that the phase value of the host command is valid, copying the host command by making a duplicated copy of the host command;
storing the copied host command in a queue in a local memory; and
executing the copied host command in the queue in the local memory.

14. The method of claim 13, wherein executing the copied host command in the queue in the local memory is performed prior to the host command reaching the memory device.

15. The method of claim 13, wherein the host command stream comprises a descriptor ring, wherein the descriptor ring comprises a plurality of entries, and wherein the host command is placed in one entry of the plurality of entries.

16. The method of claim 13, wherein determining whether the phase value of the host command is valid comprises:
determining whether the phase value derived from a write index equals a value derived from a read index.

17. A non-transitory computer-readable storage medium comprising instructions that, when executed by a processing device, cause the processing device to perform operations comprising:
monitoring a host command stream from a host system to a memory device;
determining whether a phase value of a host command in the host command stream is valid;
responsive to determining that the phase value of the host command is valid, copying the host command by making a duplicated copy of the host command;
storing the copied host command in a queue in a local memory; and
executing the copied host command in the queue in the local memory.

18. The non-transitory computer-readable storage medium of claim 17, wherein executing the copied host command in the queue in the local memory is performed prior to the host command reaching the memory device.

19. The non-transitory computer-readable storage medium of claim 17, wherein the host command stream comprises a descriptor ring, wherein the descriptor ring comprises a plurality of entries, and wherein the host command is placed in one entry of the plurality of entries.

20. The non-transitory computer-readable storage medium of claim 17, wherein determining whether the phase value of the host command is valid comprises:

determining whether the phase value derived from a write index equals a value derived from a read index.

\* \* \* \* \*